United States Patent [19]

Shen et al.

[11] Patent Number: 5,656,714

[45] Date of Patent: Aug. 12, 1997

[54] POLYESTER FROM TEREPHTHALIC ACID, 6-HYDROXY-2-NAPHTHOIC ACID, 4-HYDROXYBENZOIC ACID, 4,4'-BIPHENOL AND RESORCINOL

[75] Inventors: Sunny S. Shen, Holmdel; Larry F. Charbonneau, Mendham, both of N.J.

[73] Assignee: Hoechst Celanese Corp., Somerville, N.J.

[21] Appl. No.: 459,889

[22] Filed: Jun. 2, 1995

[51] Int. Cl.⁶ .................................................. C08G 63/02
[52] U.S. Cl. .......................... 528/193; 528/176; 528/190; 528/194
[58] Field of Search .................................. 528/176, 190, 528/193, 194

[56] References Cited

U.S. PATENT DOCUMENTS

| 4,083,829 | 4/1978 | Calundann et al. | 528/193 |
| 4,188,476 | 2/1980 | Irwin | 528/190 |
| 4,318,841 | 3/1982 | East et al. | 524/605 |

FOREIGN PATENT DOCUMENTS

| 0 049 617 A1 | 4/1982 | European Pat. Off. | C08G 63/60 |
| 0 337 727 a2 | 10/1989 | European Pat. Off. | C08G 63/60 |
| 0 450 932 A3 | 10/1991 | European Pat. Off. | C08G 63/60 |

OTHER PUBLICATIONS

Chemical Abstracts, vol. 120, No. 26, 27 Jun. 1994, Columbus, Ohio, US, abstract No. 324490.

Harada et al: "Preparation of High-Molecular-Weight Aromatic Copolyesters with Balanced Physical Properties" XP002013787 & JP,A,06 001 836 (Sumitomo Chemical Co) 11 Jan. 1994.

*Primary Examiner*—Terressa Mosley
*Attorney, Agent, or Firm*—Palaiyur S. Kalyanaraman

[57] ABSTRACT

An aromatic polyester having recurring monomer units derived from terephthalic acid, 6-hydroxy-2-naphthoic acid, p-hydroxybenzoic acid, 4,4'-biphenol, and resorcinol. This polyester is melt processible and may be amorphous or semi-crystalline.

8 Claims, No Drawings

POLYESTER FROM TEREPHTHALIC ACID, 6-HYDROXY-2-NAPHTHOIC ACID, 4-HYDROXYBENZOIC ACID, 4,4'-BIPHENOL AND RESORCINOL

BACKGROUND OF THE INVENTION

The present invention relates to the field of aromatic polyesters, especially melt processible amorphous and semi-crystalline aromatic polyesters.

There are a large number of aromatic monomers that can be used to make polyesters. As a result, a virtually infinite number of different aromatic polyester compositions are possible, each having its own unique set of physical and chemical characteristics.

U.S. Pat. No. 4,083,829 issued to Calundann et al. describes a wholly aromatic melt processible polyester consisting essentially of recurring units of p-oxybenzoyl, 2,6-dicarboxynaphthalene, symmetrical dioxy aryl, and isothaloyl and/or meta-dioxy phenylene.

U.S. Pat. No. 4,188,476 issued to Irwin describes an aromatic polyester consisting essentially of the recurring units p-oxybenzoyl, terephthaloyl, 2,6-dioxynaphthalene or 2,6-dioxyanthroquinone, and m-oxybenzoyl or 1,3-dioxyphenylene.

U.S. Pat. No. 4,318,841 describes a polyester of 6-hydroxy-2-naphthoic acid, p-hydroxybenzoic acid, terephthalic acid, and resorcinol.

SUMMARY OF THE INVENTION

The present invention provides an aromatic polyester consisting essentially of recurring monomer units derived from terephthalic acid ("TA"), 6-hydroxy-2-naphthoic acid ("HNA"), p-hydroxybenzoic acid ("HBA"), 4,4'-biphenol ("BP"), and resorcinol ("R"). This polyester is melt processible and may be amorphous or semi-crystalline, depending on the exact composition and the processing employed.

It is an object of the present invention to provide a novel wholly aromatic melt processible polyester.

It is another object of the present invention to provide a process for making a polyester consisting essentially of recurring monomer units derived from terephthalic acid, 6-hydroxy-2-naphthoic acid, p-hydroxybenzoic acid, 4,4'-biphenol, and resorcinol.

Other objects and advantages of the present invention will be apparent to those skilled in the art from the following description and the appended claims.

DETAILED DESCRIPTION OF THE PREFERRED EMBODIMENTS

In one preferred embodiment of the present invention, a polymer having monomer units derived from HBA (20–40 mole %), HNA (10–40 mole %), TA (15–30 mole %), BP (5–20 mole %), and R (5–20 mole %) is made by combining HBA, HNA, TA, BP, and R in the desired proportions with a polycondensation catalyst, such as potassium acetate, and acetic anhydride, and heating the mixture in an oxygen-free atmosphere.

The polymers of the present invention may be amorphous, exhibiting a glass transition temperature ("$T_g$") and no melting point ("$T_m$"), or semi-crystalline, exhibiting both a $T_m$ and a $T_g$. The $T_g$ of the polymers of this invention are typically in the approximate range of 100°–120° C., as measured by DSC (differential scanning calorimetry).

Although not limited to a particular viscosity, the polymers of the present invention preferably have an inherent viscosity of at least about 1.5 dl/g, more preferably about 2.0–5.0 dl/g, as determined in a pentafluorophenol solution of 0.1 percent polymer by weight at 60° C., and a melt viscosity of at least about 400 poise, more preferably at least about 500 poise, at a shear rate of 1000 s$^{-1}$ measured at 230° C. in a capillary rheometer using an orifice 1 mm in diameter and 30 mm long.

The polymer of the present invention may be used to form films, fibers, or other articles for any number of specific applications, including structural applications, optical applications, and the like. It is particularly useful where amorphous LCP is needed, e.g. transparent films for optical applications.

The following Examples illustrate several embodiments of the present invention. However, the invention should not be construed as limited to the embodiments illustrated.

EXAMPLE I

To a 500-ml 3-neck flask equipped with a half-moon shaped PTFE stirrer blade, gas inlet tube, thermocouple, and a Vigreux column connected to a condenser and receiver, were added:

| | |
|---|---|
| 41.440 g HBA (0.3 mole) | 18.600 g BP (0.1 mole) |
| 56.456 g HNA (0.3 mole) | 11.012 g R (0.1 mole) |
| 33.226 g TA (0.2 mole) | 0.02 g potassium acetate |
| 105.48 g acetic anhydride (2.5% excess). | |

The flask was immersed in an oil bath having a temperature control means, and evacuated and flushed three times with nitrogen to eliminate oxygen. The flask and its contents were heated to 200° C. over a period of 60 minutes while being stirred at a rate of 250 rpm. Acetic acid began to distill over immediately, and 10 ml had been collected by the time the temperature reached 200° C.

The reaction temperature was then raised at a rate of 1° C./min to 320° C. by which time 96 ml acetic acid had distilled out. The flask and contents were heated for another 60 min at 320° C., by which time a total of 110.5 ml acetic acid had been collected. The flask was then evacuated to a pressure of 1.0 mbar at 320° C. while stirring. The polymer melt in the flask continued to increase in viscosity while the remaining acetic acid was removed.

The foregoing process produced a polyester having an I.V. of 2.5 dl/g as determined in a pentafluorophenol solution of 0.1 percent polymer by weight at 60° C., and a melt viscosity of 550 poise at a shear rate of 1000 s$^{-1}$ measured at 230° C. in a capillary rheometer using an orifice 1 mm in diameter and 30 mm long.

DSC (10° C./min heating rate) indicated that the polyester had a $T_g$ of 106° C. Hot-stage cross-polarized optical microscopy indicated a transition temperature from solid to liquid crystalline ($T_{s-lc}$) at 170° C. The polymer was optically anisotropic.

EXAMPLES II–XIV

An additional thirteen compositions were made according to the procedure of Example I, each having a different mole ratio of the five monomer components.

Table 1 shows the mole ratio, $T_g$, $T_m$, $T_{s-lc}$, and I.V. for each composition of Examples I–XIV.

TABLE 1

| Ex. | HBA:HNA:TA:BP:R | $T_g$ (°C.) | $T_m$ (°C.) | $T_{s-1c}$ (°C.) | I.V. (dl/g) |
|---|---|---|---|---|---|
| I | 30:30:20:10:10 | 106 | none | 170 | 2.5 |
| II | 20:30:25:15:10 | 108 | none | 280 | 2.74 |
| III | 30:20:25:15:10 | 107 | none | 275 | 2.12 |
| IV | 40:10:25:15:10 | 106 | none | 255 | 1.96 |
| V | 30:10:30:20:10 | 111 | none | 280, 385 | 2.64 |
| VI | 20:20:30:20:10 | 108 | none | 350, 385 | 2.74 |
| VII | 10:30:30:20:10 | 113 | none | 290, 400 | 2.48 |
| VIII | 20:30:25:10:15 | 113 | none | 160 | 2.10 |
| IX | 20:30:25:5:20 | 122 | none | 163 | 1.76 |
| X | 20:40:20:15:5 | 109 | 282 | 125 | 3.34 |
| XI | 30:30:20:15:5 | 109 | 260 | 155 | 2.68 |
| XII | 30:40:15:10:5 | 107 | 205 | 145 | 3.30 |
| XIII | 35:35:15:10:5 | 107 | 193 | | 4.14 |
| XIV | 20:30:25:20:5 | 112 | 338 | | 3.93 |

EXAMPLE XV

A polyester was made and analyzed according to Example I; the analysis showed an I.V. of 2.9, a $T_g$ of 107.5° C., and no $T_m$ (i.e. it was amorphous). This polyester was melt spun into fiber at 248° C. using 1310 psi pressure, using a Micromelt I™ apparatus (custom-made by Hoechst Celanese Corporation of Summit, N.J.) and a throughput of 0.15 g/min, with a take-up speed of 270 m/min, producing a fiber of 8.1 denier. The fiber was drawn to 73 times its as-spun length. Standard measurements indicated that the drawn fiber had a tensile strength of 4.9 g/denier, an elongation of 1.6%, and an initial modulus of 454 g/denier.

EXAMPLE XVI

A polyester was made and analyzed as in Example IX; the analysis showed an I.V. of 1.63, a $T_g$ of 118.8, and no $T_m$ (i.e. it was amorphous). This polyester was melt spun into fiber at 314° C. using a Micromelt I™ apparatus (custom-made by Hoechst Celanese Corporation of Summit, N.J.) and a throughput of 0.15 g/min and 1310 psi pressure, with a take-up speed of 100 m/min, producing a fiber of 19.7 denier. The fiber was drawn to 30 times its as-spun length. Standard measurements indicated that the drawn fiber had a tensile strength of 3.1 g/denier, an elongation of 3.4%, and an initial modulus of 183 g/denier.

Many variations of the present invention not illustrated herein will occur to those skilled in the art. The present invention is not limited to the embodiments illustrated and described herein, but encompasses all the subject matter within the scope of the appended claims.

We claim:

1. An aromatic polyester having recurring monomer units derived from terephthalic acid, 6-hydroxy-2-naphthoic acid, p-hydroxybenzoic acid, 4,4'-biphenol, and resorcinol.

2. The polyester of claim 1 wherein for every 100 moles of said recurring monomer units in said polyester, said polyester contains 20–40 moles p-hydroxybenzoic acid units, 10–40 moles 6-hydroxy-2-naphthoic acid units, 15–30 moles terephthalic acid units, 5–20 moles 4,4'-biphenol units, and 5–20 moles resorcinol units.

3. A polyester according to claim 2 having an inherent viscosity of at least about 1.5 dl/g as determined in a pentafluorophenol solution of 0.1 percent polymer by weight at 60° C., and a melt viscosity of at least about 400 poise at a shear rate of 1000 s$^{-1}$ measured at 230° C. in a capillary rheometer using an orifice 1 mm in diameter and 30 mm long.

4. The polyester of claim 3 wherein said inherent viscosity is about 2.0–5.0 dl/g, and said melt viscosity is least about 500 poise.

5. A polyester according to claim 1 having an inherent viscosity of at least about 1.5 dl/g as determined in a pentafluorophenol solution of 0.1 percent polymer by weight at 60° C.

6. A polyester according to claim 1 having a melt viscosity is least about 400 poise at a shear rate of 1000 s$^{-1}$ measured at 230° C. in a capillary rheometer using an orifice 1 mm in diameter and 30 mm long.

7. A polyester according to claim 1 having a glass transition temperature in the approximate range of 100°–120° C.

8. An aromatic polyester having recurring monomer units derived from terephthalic add, 6-hydroxy-2-naphthoic acid, p-hydroxybenzoic acid, 4,4'-biphenol, and resorcinol, wherein for every 100 moles of said recurring monomer units therein, said polyester contains 20–40 moles p-hydroxybenzoic acid units, 10–40 moles 6-hydroxy-2-naphthoic acid units, 15–30 moles terephthalic acid units 5–20 moles, 4,4'-biphenol units, and 5–20 moles resorcinol units, said polyester having a glass transition temperature in the approximate range of 100°–120° C., an inherent viscosity of at least about 1.5 dl/g as determined in a pentafluorophenol solution of 0.1 percent polymer by weight at 60° C., and a melt viscosity of at least about 400 poise at a shear rate of 1000 s$^{-1}$ measured at 230° C. in a capillary rheometer using an orifice 1 mm in diameter and 30 mm long.

* * * * *